United States Patent [19]

Davis et al.

[11] Patent Number: 5,426,436
[45] Date of Patent: Jun. 20, 1995

[54] RADAR APPARATUS

[75] Inventors: John H. Davis, Ilford; Russell C. Gould; Stuart Kirkbride, both of Chelmsford, all of England

[73] Assignee: Smiths Industries Public Limited Company, London, England

[21] Appl. No.: 178,361

[22] Filed: Jan. 6, 1994

Related U.S. Application Data

[63] Continuation of Ser. No. 974,815, Nov. 16, 1992, abandoned, which is a continuation of Ser. No. 791,409, Nov. 14, 1991, abandoned.

[30] Foreign Application Priority Data

Nov. 21, 1990 [GB] United Kingdom ............... 9025286

[51] Int. Cl.⁶ .................................................. G01S 7/22
[52] U.S. Cl. ...................................... 342/182; 342/183
[58] Field of Search ............... 342/182, 176, 177, 179, 342/183

[56] References Cited

U.S. PATENT DOCUMENTS

| | | | |
|---|---|---|---|
| 3,623,090 | 11/1971 | Gilbert et al. | 342/29 |
| 3,863,098 | 1/1975 | Mehr | 315/367 |
| 4,028,695 | 6/1977 | Saich | 340/709 X |
| 4,307,396 | 12/1981 | Slater | 342/182 |
| 4,623,966 | 11/1986 | O'Sullivan | 342/182 |
| 4,706,090 | 11/1987 | Hashiguchi et al. | 342/41 |
| 4,836,579 | 6/1989 | Pease et al. | 342/197 |
| 4,903,309 | 2/1990 | Wentworth et al. | 382/1 |
| 4,979,137 | 12/1990 | Gerstenfeld et al. | 364/578 |
| 4,994,795 | 2/1991 | MacKenzie | 340/710 |
| 4,994,971 | 2/1991 | Poelstra | 364/424.04 |
| 5,006,836 | 4/1991 | Cooper | 340/710 |
| 5,032,842 | 7/1991 | Tanigaki et al. | 342/182 |
| 5,056,411 | 10/1991 | Baker | 89/41.22 |
| 5,119,479 | 6/1992 | Arai et al. | 395/275 |
| 5,122,654 | 6/1992 | Koh et al. | 250/211 |
| 5,173,861 | 12/1992 | Inselberg et al. | 364/461 |
| 5,179,385 | 1/1993 | O'Loughlin et al. | 342/176 |
| 5,200,902 | 4/1993 | Pilley | 364/439 |
| 5,250,929 | 10/1993 | Hoffman et al. | 345/146 |
| 5,270,689 | 12/1993 | Hermann | 345/145 |
| 5,283,560 | 2/1994 | Bartlett | 345/113 |
| 5,289,168 | 2/1994 | Freeman | 345/121 |
| 5,302,968 | 4/1994 | Heberle | 345/131 |
| 5,307,086 | 4/1994 | Griffin et al. | 345/146 |
| 5,315,313 | 5/1994 | Shinagawa | 345/145 |
| 5,317,687 | 5/1994 | Torres | 395/159 |
| 5,319,747 | 6/1994 | Gerrissen et al. | 395/155 |
| 5,321,420 | 6/1994 | Rezek et al. | 345/134 |
| 5,334,997 | 8/1994 | Scallon | 345/167 |

FOREIGN PATENT DOCUMENTS 2154109  8/1985  United Kingdom .

OTHER PUBLICATIONS

Patent Abstracts of Japan; vol. 13, No. 152 (P856), Apr. 13, 1989 (JP-A-63313226).
"A Taxonomy of Window Manager User Interfaces" by B. A. Myers, IEEE Computer Graphics and Applications, Sep. 1988, pp. 65–84.

*Primary Examiner*—John B. Sotomayor
*Attorney, Agent, or Firm*—Pollock, VandeSande and Priddy

[57] ABSTRACT

A marine radar has a screen on which is displayed a radar image and several representations of the different control functions of the radar such as range, gain and sea clutter setting. The radar also has a key pad with three keys and a tracker ball that is connected to the radar control unit. The control unit generates a marker on the screen that is movable by the tracker ball. To change one of the control functions, the tracker ball is displaced until the marker moves into the region of the representation of the appropriate control function. The control unit then produces three boxes on the screen below the control function to indicate the different options available for that function. The user can select the desired option by pressing the appropriate one of the three keys.

9 Claims, 2 Drawing Sheets

RADAR APPARATUS

This application is a continuation of Ser. No. 07/974,815, filed on Nov. 16, 1992, which was a continuation of Ser. No. 07/791,409 filed Nov. 14, 1991 both abandoned.

BACKGROUND OF THE INVENTION

This invention relates to radar apparatus.

Modern marine radar apparatus is required to be highly versatile in order to provide the user with the clearest information about his surroundings. Many different features are commonly available. For example, the radar display can be presented in different ways: north up; course up; or heading up. The range displayed is often adjustable so that a relatively short range is represented when the vessel is entering or leaving port, or navigating a narrow passage, whereas a longer range is displayed when the vessel is in open waters. Heading vectors of the radar carrying vessel can be displayed to indicate future course, whereas trails can be displayed to indicate the vessel's previous track. Potential collision risks can be identified and tracked with information provided on the display as to the closest point of approach between the two vessels. This display can be switchable between different antennas and usually has several adjustable parameters such as gain, sea clutter, rain clutter, contrast, brilliance and so on. Additional information can be superimposed on the display such as stored maps of the area being navigated.

This multiplicity of features leads to apparatus of high complexity and requires the apparatus to have a large number of dedicated keys, switches or knobs etc. to control the many different functions. Accordingly, the apparatus is often difficult to use and requires a considerable period of use before the operator is familiar with its operation. This problem is aggravated by the fact that apparatus on different vessels may be from different manufacturers and have different layouts and by the fact that radar operators often move frequently from vessel to vessel.

BRIEF SUMMARY OF THE PRESENT INVENTION

It is an object of the present invention to provide radar apparatus with simplified operation with which a user can become readily familiar.

According to one aspect of the present invention there is provided radar apparatus comprising a radar display screen; a display control unit for providing on the screen a radar display image, at least one representation of a control function of the apparatus, and a movable marker; and user entry means comprising a manually-displaceable member and a plurality of keys, the manually-displaceable member being operable to control the position of the marker on the screen such that, when the marker is positioned in the region of the representation of the control function, the control unit causes to be displayed on the screen a plurality of representations of options for the control function equal to the number of keys on the entry means so that the user can select the desired option for the control function by actuation of the appropriate key.

The user entry means preferably includes not more than five keys, so that it can be operated by one hand, and preferably has three keys. The manually-displaceable member may be a tracker ball. The control unit is preferably arranged to provide a plurality of representations of different control functions which can be selected by moving the marker into the region of the appropriate representation. One or more of the representations or each representation of a control function may include a numerical value, the control unit being arranged to alter the numerical value after actuation of a key on the entry means and displacement of the manually-displaceable member. The representation of a control function may be selected from a group comprising: range, orientation of radar image, gain, sea clutter and radar clutter.

According to another aspect of the present invention there is provided a method of controlling radar apparatus including the steps of providing on a screen a radar display image, at least one representation of a control function of the apparatus, and a movable marker; displacing a manually-displaceable member to move the marker to the region of the representation of the control function so as to cause a plurality of options for the control function to be displayed on the screen; and actuating one of a plurality of keys equal to the number of options in order to select the desired option.

In this way, it is possible to change any of the different control functions of complex radar apparatus by means of one tracker ball or the like and three keys.

A marine vessel radar and its method of use, in accordance with the present invention, will now be described, by way of example, with reference to the accompanying drawings.

DESCRIPTION OF THE PREFERRED EMBODIMENTS

Figure 1:
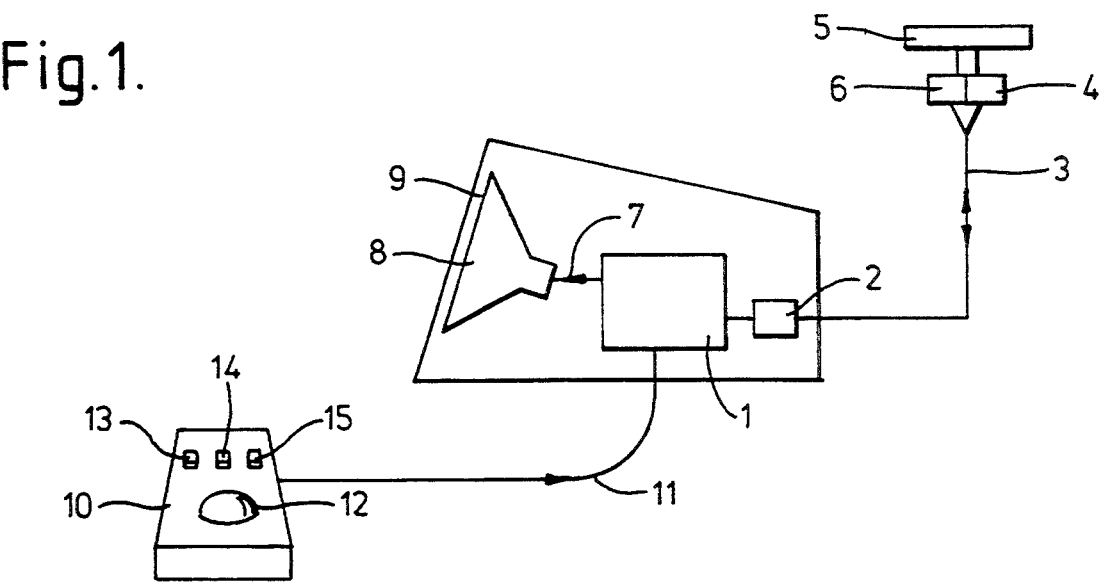
FIG. 1 shows the apparatus schematically.
Figure 2:
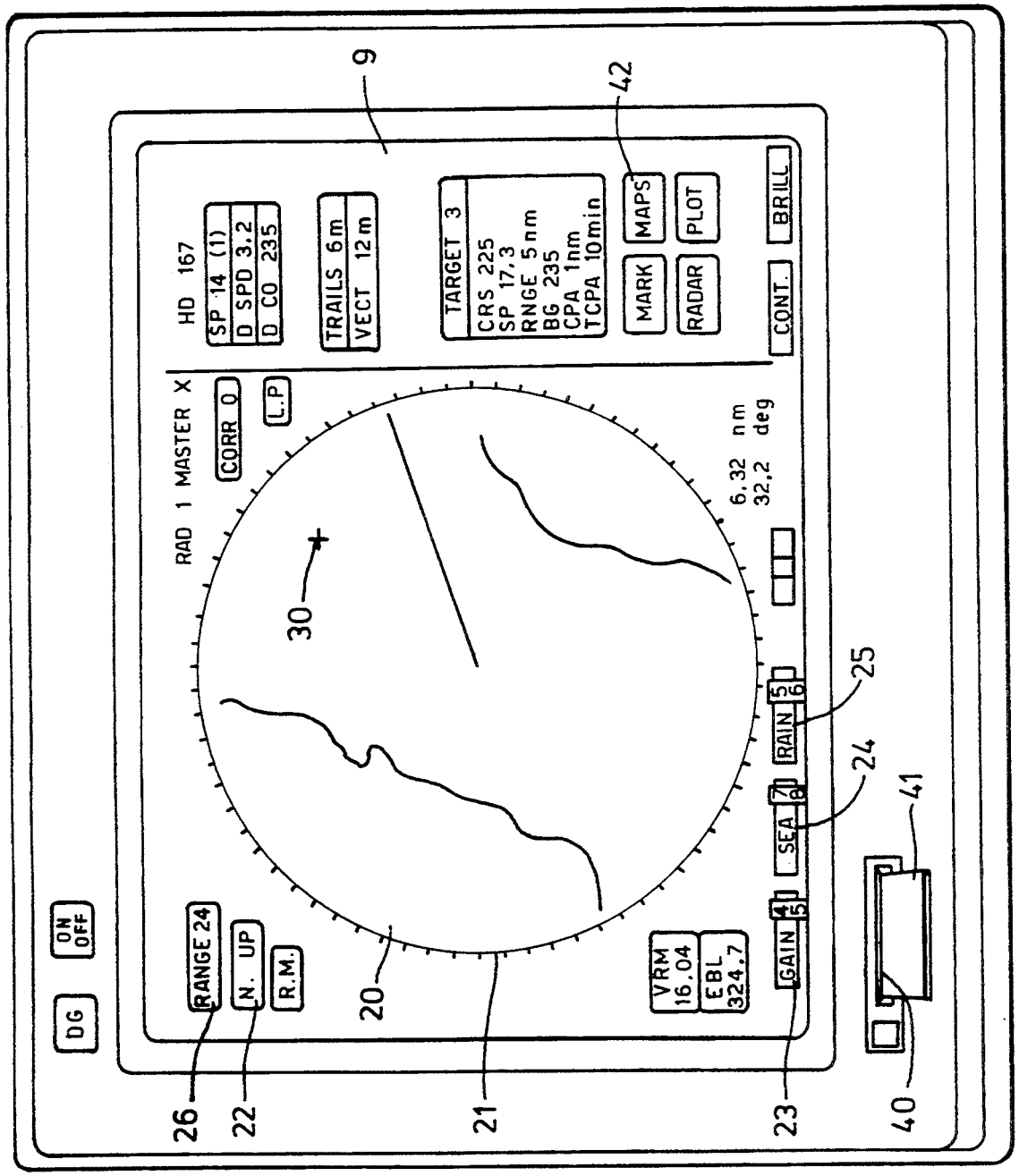
FIG. 2 is a front elevation view of a display screen of the apparatus.

With reference first to FIGS. 1 and 2, the radar apparatus comprises a control unit 1 which controls operation of a transmitter/receiver unit 2. The transmitter/receiver unit 2 supplies signals via line 3 to a microwave source 4 that in turn generates microwave pulses which are supplied to a rotating radar antenna 5. Received pulses are detected by a detector 6 and supplied via line 3 to the transmitter/receiver unit 2. The control unit 1 processes the received signals in the usual way and supplies display driver signals via lines 7 to a raster-scanned colour CRT 8 having a screen 9 on which a radar display image is represented. The way in which the radar image is provided can be conventional and is not described in detail here.

The control unit 1 also supplies signals to the CRT 8 for providing graphic, textual and control function representations. The control functions are selected by user entry means in the form of a control pad 10 which is described in greater detail below.

The screen 9 of the CRT 8 is rectangular and is mounted landscape fashion, with its longer sides horizontal. The control unit 1 causes the radar image to be displayed in a circular region 20 offset to the left-hand side of the screen, within a circle 21 of bearing graduations. The state of the setting of various control functions of the apparatus is represented on the screen 9 at different locations around the region 20. For example, the box 22 to the top left bears the legend "N. UP" to indicate that the radar image in the region 20 is presently presented in a north-up configuration. The boxes 23, 24 and 25 respectively indicate that the gain setting is about 4.5, the sea clutter setting is about 7.8 and the rain clutter setting is about 5.5. The box 26 indicates that the range setting is 24 miles. The meaning of the other legends will be obvious to anyone familiar with marine radars and need not be explained here.

The key-pad 10 is about the size of an average hand and is connected to the control unit 1 by means of a flexible cable 11 so that the keypad can be located at any point convenient for the user. Alternatively, the key-pad could be mounted in a fixed location relative to the screen 9. The lower surface of the key-pad 10 is preferably non-slip and the upper surface has four separate controls 12 to 15. One control 12 takes the form of a tracker ball that is manually displaceable by the user contacting it with the palm of his hand or thumb, so that the ball can be rotated in any direction: forwards, backwards or sideways. The construction of such tracker balls is well known. The other three controls 13 to 15 are manually-depressible keys located forwardly of the tracker ball 12 in positions where they will be contacted by the forefinger, middle finger and fourth finger of the right hand when the palm or thumb rests on the tracker ball. By rotating the key-pad 10 to the right, it can be used alternatively by the left hand. Although two keys, or more than three keys could be used, it is preferable for the number not to exceed five, so that the key-pad can be used by one hand. It has been found that three keys are preferable.

The tracker ball 12, in conjunction with the control unit 1, controls the position on the screen 9 of a marker 30 which may, for example, take the form of a cross when positioned within the region 20, and which may change to a different shape, such as an arrow head, when moved outside the region. The marker 30 can be moved to any point on the screen 9 by displacing the tracker ball 12. Techniques by which markers can be generated on a screen and moved over the screen are well known.

Any of the control functions of the apparatus can be changed by moving the marker 30 into the box on the screen 9 relating to that control function and by actuating an appropriate one of the keys 13 to 15.

Figure 3:
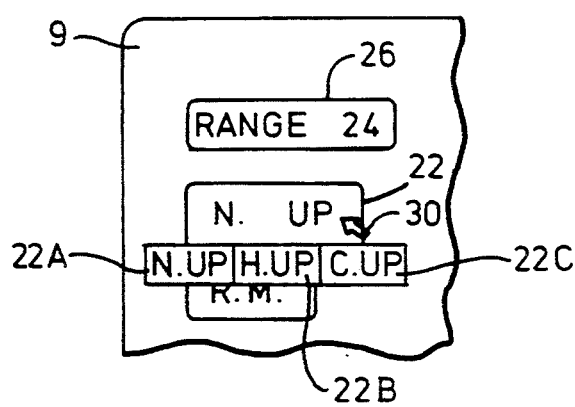
FIGS. 3 to 5 show different parts of the display screen during use.

For example, FIG. 3 shows the effect of moving the marker 30 into the box 22 bearing the legend "N. UP". This automatically causes the display to change, with the box 22 changing colour and three additional boxes 22A, 22B and 22C dropping down beneath the box 22, without the need for the user to actuate any of the keys 13 to 15. The boxes 22A to 22C bear the legends "N. UP", "H. UP" and "C. UP" to indicate north-up, heading-up and course-up respectively. The number of boxes corresponds to the number of keys 13 to 15 and each key is associated with an individual one of the boxes 22A to 22C. The left-hand key 13 is associated with the left-hand box 22A, the central key 14 is associated with the central box 22B, and the right-hand key 15 is associated with the right-hand box 22C. If the user wishes to change the radar image presentation to, for example, a heading-up orientation, he simply presses the central key 14 corresponding to the central box 22B. The control unit 1 receives the signals from the key-pad 10 and effects the change in representation without any further intervention from the user. The main box 22 also changes to read "H.UP" to indicate that the radar image is now presented heading-up. When the user moves the tracker ball 12 to displace the marker 30 out of the box 22, the boxes 22A to 22C are removed from the screen 9. If the user, instead, decided that the radar image should remain in a north-up orientation, he could simply move the marker 30 out of the box 22 so that it returns to its original colour and continues to show the legend "N.UP". Alternatively, he could press the left hand button 13, associated with the lower box 22A which would have the same effect.

Figure 4:
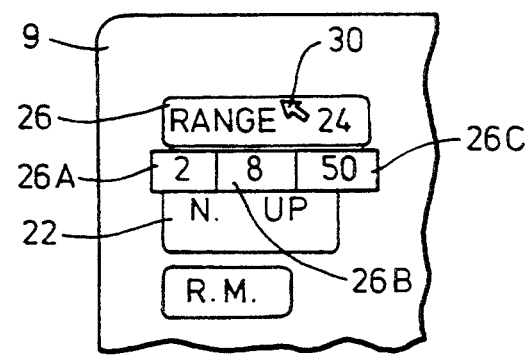
Figure 5:
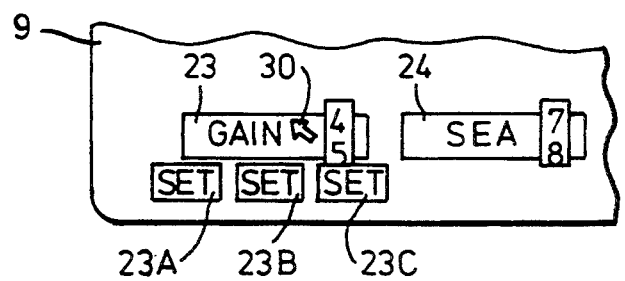

In another example, the range setting of the radar display is changed by moving the marker 30 to box 26 bearing the legend "RANGE 24". As soon as the marker 30 enters the box 26, the box changes colour and three lower boxes 26A to 26C drop down beneath the main box, as shown in FIG. 4 The boxes 26A to 26C bear the legends "2" "8" and "50" respectively to indicate the different options of the range that can be set by the user. If the user wishes to increase the range to 50 miles, he presses the right hand key 15 and this causes the display to change to a 50 mile range and the main box 26 to change to read "RANGE 50". The right-hand lower box 26C would also change from "50" to "24" so that the user could reselect the 24 mile range, if he wished, by pressing the right hand key 26C. Movement of the marker 30 out of the box 26 causes it to return to its original colour and deletes the lower boxes 26A to 26C.

Where the control function is more variable, as in the gain, sea clutter and rain clutter settings, the functions are set in a somewhat different way. For example, if the user wishes to increase the gain from the present value of 4.5, he moves the marker 30 to the gain box 23. This causes the gain box 23 to change in colour and three lower boxes 23A to 23C to drop below the main box, mimicking the disposition of the three keys 13 to 15 on the pad 10, as shown in FIG. 5. All three boxes 23A to 23C bear the same legend "SET" indicating to the user that any one of the keys 13 to 15 can be pressed to change the setting. After actuation of any key 13 to 15, the user uses the tracker ball 12 to increase or decrease the gain setting. Pushing the ball 12 forwardly rotates forwards the numerical drum in the right of the box 23 to increase the gain; pushing the ball backwards cause the drum to rotate in the opposite direction and the gain to be reduced. When the desired gain setting is achieved, the user presses any of the keys 13 to 15 to set the gain value selected. Subsequent movement of the tracker ball 12 moves the marker 30 rather than altering the gain setting.

It can be seen that, while it is preferable for the screen to show three user-selectable options, one for each key 13 to 15, it is not essential for these options to be different from one another. In some cases, the keys are simply used to turn a function on or off. Up to four different options can be represented at one time, that is one in the main box and one in each of the three lower boxes. Where the number of options available exceeds four, it may be necessary to actuate the keys more than once. The first actuation would select one of three different sub-sets of options and the subsequent actuation would select between one of up to three different options within the sub-set, or would select further sub-sets. In general, however, for most of the radar functions it has been found that they can be set by making a single movement of the tracker ball and just one key actuation.

The radar apparatus also has facility for superimposing on the radar image a map which may either be a stored map of the area or may be created by the user. In this respect, the apparatus has a slot 40 by which a smart card or ROM 41 can be entered which contains a digital representation of the map. The map is displayed by moving the marker 30, using the tracker ball 12, to the box 42 labelled "MAPS". This causes three boxes to drop down beneath box 42, labelled "DISPLAY", "CREATE" and "DELETE". By actuating the appropriate key, the user can either display the stored maps of the region from the card 41, or create his own map (by drawing on the screen with the marker 30), or delete any currently displayed map.

Alternative techniques for selecting different options have been considered but have been found to suffer from disadvantages. For example, once the marker had been moved to the desired function box, the different options available could be represented automatically and the marker then moved, by the tracker ball, to overlie the required option. This technique, however, would require the user to press a key before moving the marker to the required option (otherwise the options would disappear as soon as the marker went outside the main box) and also to press a key when the marker was correctly positioned on the selected option. This, therefore, would require two tracker ball movements and two key actuations in contrast with the single tracker ball movement and single key actuation possible with the present invention. Apparatus of the present invention is, therefore, very easy to use and its operation is quickly learned by operators unfamiliar with the apparatus. This reduces the training necessary and means that the operator is more quickly able to operate the apparatus safely in different conditions.

Radar apparatus of the present invention has a particular advantage during night time use. With conventional radar apparatus it is necessary to illuminate all the various controls so that the user knows which is which. This leads to complications in controlling the illumination of the lighting relative to the brightness of the screen so that both the screen and the controls are clearly visible. With the present invention, there is no need for any illumination of the user entry means since it can be readily used by feel alone and without having to see it.

Various modifications to the apparatus are possible. For example, in place of a tracker ball, other manually-displaceable members could be used, such as a mouse or joystick. It is preferable that this is arranged such that the operator can move the displaceable member and actuate the keys with the same hand and without substantially changing the position of his hand.

What we claim is:

1. In radar apparatus of the kind comprising a radar display screen, a display control unit for providing on the screen a radar display image, and a user entry device for selecting a control function of the apparatus, the improvement wherein said display control unit is arranged to provide on the screen at least one representation of a control function of the apparatus and a movable marker, said user entry device comprising a plurality of keys and a manually-displaceable member that is displaceable to control the position of the marker on the screen, said keys being located close to said manually-displaceable member so that the keys can be operated by the same hand of the user that controls the manually-displaceable member such that positioning of the marker in the region of a representation of the control function is sufficient in itself to cause said display control unit to automatically display on the screen a plurality of representations of options for the control function equal to the number of keys on said user entry device, each of said keys being associated with a different one of the options displayed on the screen so that the user can switch the radar apparatus to the desired option for the control function solely by actuation of the appropriate one of said keys.

2. Radar apparatus according to claim 1, wherein the user entry device includes not more than five keys.

3. Radar apparatus according to claim 2, wherein the user entry device has three keys.

4. Radar apparatus according to claim 1, wherein the manually-displaceable member is a tracker ball.

5. Radar apparatus according to claim 1, wherein the control unit provides representations on the screen of different ones of said control functions which functions can be individually selected by moving the marker into the screen region of the appropriate representation.

6. Radar apparatus according to claim 1, wherein at least one or more representation of a control function includes a numerical value, and wherein the control unit alters the numerical value after actuation of a key on the entry device and in response to displacement of the manually-displaceable member.

7. Radar apparatus according to claim 1, wherein the representation of a control function is selected from a group comprising: range, orientation of radar image, gain, sea clutter and radar clutter.

8. Radar apparatus comprising: a radar display screen; a display control unit for providing on the screen a radar display image, a movable marker and a plurality of representations of different control functions of the apparatus; a user entry device including three keys and a manually-displaceable member, the keys being located close to the manually-displaceable member so that the keys can be operated by the same hand of the user that controls the manually-displaceable member; and means connecting the user entry device to the control unit such that displacement of the manually-displaceable member causes the control unit to displace the marker on the screen, the control unit being operative, solely in response to the positioning of the marker in the region of a representation of a control function, to automatically provide on the screen displays representing three different options for that control function, each of said keys being associated with a different one of the options displayed on the screen, and the control unit being further operative to switch the radar apparatus to one of said three different control function options solely in response to the user's actuation of a corresponding one of the three keys on the user entry device after said three different control function options have been displayed on the screen.

9. A method for controlling the operation of a radar apparatus having a screen on which a radar image is displayed, the method including the steps of providing on the screen at least one representation of a control function of the apparatus and a movable marker; displacing a manually-displaceable member with one hand to move the marker to the region of the representation of the control function so as to cause a plurality of different options for the control function automatically to be displayed on the screen solely in response to movement of said marker to said region; and subsequently actuating one of a plurality of keys located for operation by the same hand used to displace the manually-displaceable member, the number of keys being equal to the number of said options so that actuation of different ones of said keys selects corresponding different ones of said options and thereby changes the operation of the radar apparatus in accordance with a selected option solely in response to actuation of the one of said keys corresponding to the selected option.

* * * * *